July 18, 1967 J. M. LIEBIG 3,331,611
BEARING SEAL WITH PLASTIC REINFORCING MEMBER
Filed Oct. 19, 1965
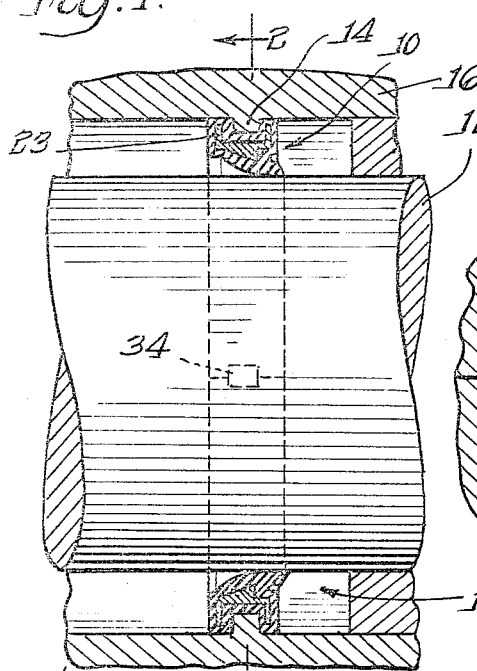
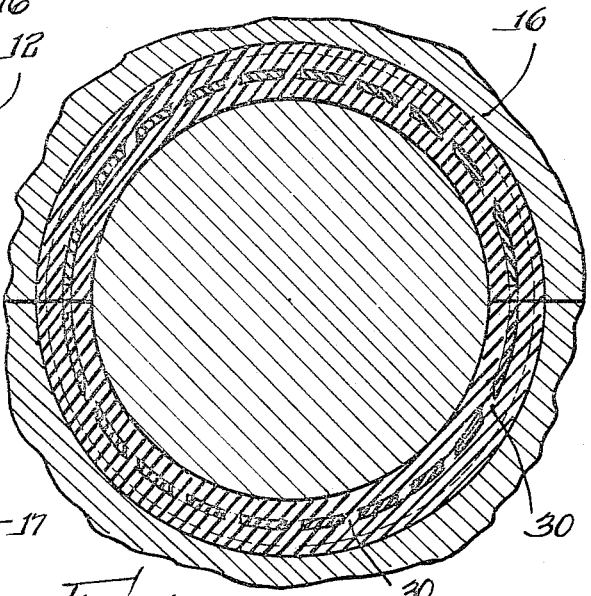
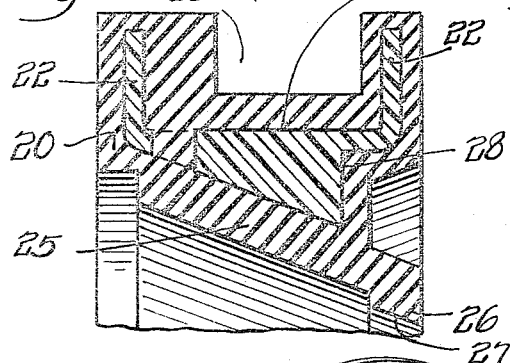
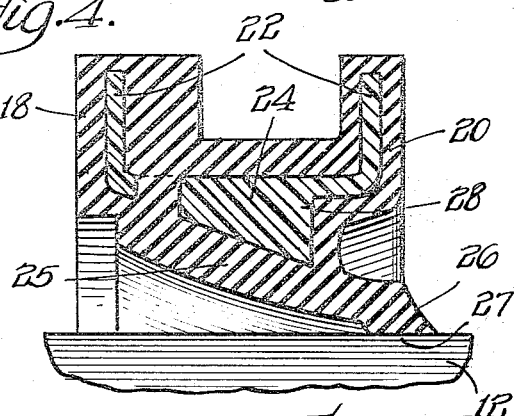
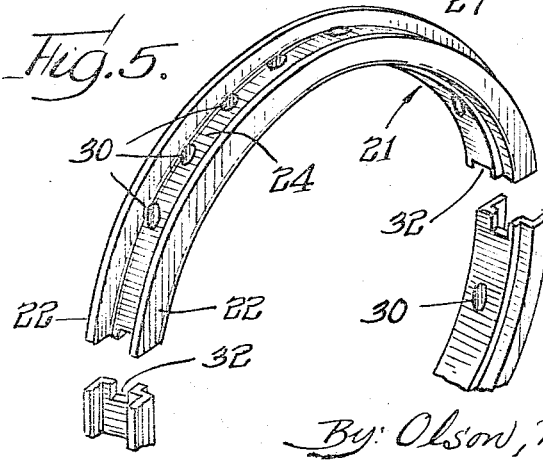
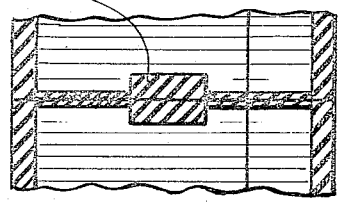
Inventor
Joseph M. Liebig
By: Olson, Trexler, Wolters & Bushnell
attys

United States Patent Office 3,331,611
Patented July 18, 1967

3,331,611
BEARING SEAL WITH PLASTIC REINFORCING MEMBER
Joseph M. Liebig, Wheaton, Ill., assignor to Illinois Milling Inc., Bensenville, Ill., a corporation of Delaware
Filed Oct. 19, 1965, Ser. No. 497,814
5 Claims. (Cl. 277—178)

ABSTRACT OF THE DISCLOSURE

An arcuate bearing seal of elastomeric material for riding engagement with a rotating shaft to prevent escape of oil axially along the shaft, and having an embedded reinforcing member of resinous plastic construction.

---

This invention relates generally to an oil seal and more particularly to an oil seal for a rotating shaft.

Prior art oil seals are manufactured in two separate pieces, one piece comprising the top member, which is placed over the upper part of the shaft, and another piece comprising a lower member, which is placed over the lower part of the shaft. Each of the two sealing members typically comprises a rubber or similar elastomeric material seal member with a rigid metallic reinforcing member or insert. In these prior art devices the rubber seal may be provided with a lip which extends generally radially in from the main body of the seal. This lip will, due to the natural resilience of the rubber, tend to form a seal against the shaft. The deficiency in this type of structure is that the rubber lip, which forms the seal, has not been adequately supported. Therefore, although a tight seal initially has been made at the shaft, relaxation of the rubber due to high temperatures, wear, and aging eventually has led to leakage past the seal.

A great step forward over previously existing prior art in solving the problem of properly supporting the rubber lip was made by my invention as disclosed and claimed in my copending application Ser. No. 428,054, filed on Jan. 26, 1965, for "Reinforced Bearing Seal." In that application a stamped sheet metal member was disclosed as the reinforcing insert. The reinforcing member or insert has a radially inwardly extending trough or depression providing a measure of support for the rubber lip. The very nature of the metal stamping limits the amount that the reinforcing trough or depression could extend down into the lip of the oil seal. Also, with this type of reinforcing member there is an indentation, on the upper part of the reinforcing member as a result of stamping out the reinforcing trough or depression. This indentation is filled with the elastomeric material with which the reinforcing portion is covered. When placed in position, the seal will not press against the shaft on which it is installed as rigidly as may be desired, due to the large bead of elastomeric material which tends to deflect under pressure, particularly when exposed to heat and hot oil. While the seal shown in my pending application Ser. No. 428,054 represents a definite improvement over the prior art devices, it is still short of perfection. A further advance toward perfection is made by the present invention including the reinforcing member disclosed in this application.

A common shortcoming of prior art oil seals is the tendency of the elastomeric material to become disengaged from the reinforcing member. This separation would result from either the poor bonding characteristics of the elastomeric material to the reinforcing member, or due to the shear action of the forces that would be applied to the seal when installed. It is to be borne in mind that sheet metal stampings inherently have oil on them from the stamping machine. It is difficult and costly to remove this oil, and it often is imperfectly done to the extent that poor bonding of rubber thereto results. Another problem with prior art devices is the tendency of the seal to leak at the point where the upper and lower seal sections meet.

A general object of the present invention is to provide an improved oil seal which overcomes the limitations of the prior art by providing a reinforcing member which supports the lip of the oil seal.

Another object of this invention is to provide a reinforcing member which has better bonding characteristics than is obtainable with prior art metal reinforcing members.

In the drawings:

FIG. 1 is a fragmentary axial sectional view of the oil seal as it is installed around a rotating shaft;

FIG. 2 is a fragmentary cross-sectional view taken along the line 2—2 of FIG. 1;

FIGS. 3 and 4 are fragmentary axial sectional views of the details of the reinforcing insert and the elastomeric material which comprise the seal;

FIG. 5 is a perspective view of the reinforcing insert; and

FIG. 6 is a fragmentary sectional view of the joint between the two members which compose the seal.

Referring now to the drawings in greater detail, there is shown in FIG. 1, one preferred embodiment of the present invention. The seal, indicated generally at 10, is installed around a rotating shaft 12, such as the crankshaft of an automotive engine. As will be seen from FIG. 1, the seal 10 is mounted by means of radially inwardly extending circumferential flanges 14 of the engine block and bearing cap 16. The seal is utilized to retain oil in the oil chamber 17.

The body 18 of the seal has a generally U-shaped section, as is seen in FIGS. 3 and 4. The body consists of an elastomeric material 20 in which is embedded a reinforcing element 21 which has two side sections or flanges 22 and a base section 24, see also FIG. 5. An outwardly opening circumferential groove 23 in the body 18 lies between the flanges 22 and receives the flanges 14. There is a generally wedge-shaped sealing lip 25 which extends radially in from the main body portion of the seal. This sealing lip has a distal portion or fin 26 which sealingly engages the rotating shaft 12. The seal at this distal portion or fin results from the natural resiliency of the elastomeric material which is forced against the rotating shaft. It will be noted that the sealing surface 27 of the distal fin 26 is initially frusto-conical (FIG. 3) and is deflected or stretched to a cylindrical shape (FIG. 4) upon installation. The lip including the distal portion 26 of the seal 10 is reinforced by a wedge-shaped rib 28 which extends in from the base section 24 of the reinforcing element. By having the reinforcing rib 28 extend into the lip and of similar shape thereto the distal portion 27 is held into position against the rotating shaft 12 and forms a much firmer seal than has previously been possible.

The reinforcing member 21 and the reinforcing rib 28 are molded from a synthetic plastic material, such as nylon. By having a molded plastic reinforcing member, rather than a stamped metal one as in my copending application Ser. No. 428,054, the reinforcing rib can extend further down into the lip of the seal than was previously possible. Such extension and the relatively sharp corner possible provide a much better support for the distal portion of the lip than has been possible heretofore. Plastic is utilized for the reinforcing rib, since it has bonding characteristics which result in a stronger bond between the elastomeric material 20 and the reinforcing member. Furthermore, the molded reinforcing member has no oil on it which would prevent bonding if not completely removed. Thus the reinforcing member not only provides more support for the lip 26 of the seal than in prior art seals, but also provides for a stronger bond between the elastomeric material and the reinforcing member.

Circumferentially spaced parallel holes 30 in the reinforcing member 21 are filled with the elastomeric material 20, aiding in fixing the elastomeric material and the reinforcing member together. The sides of these holes 30 are all parallel, as is clearly shown in FIGS. 2 and 5. Any tendency of the reinforcing member to rotate circumferentially relative to the elastomeric material is additionally resisted by the elastomeric material which fills the holes 30. Since the holes 30 all have parallel axes, there is better distribution of the elastomeric material in the mold in which the seals are formed, thus leading both to better bonding and to a more uniform and dependable product.

It should also be noted that the holes 30 are circular in shape. In most of the prior art devices the holes were generally oblong. By having a circular shape a more even bond between the elastomeric material and the reinforcing rib is obtained. The strength of this bond is enhanced by the natural bonding characteristics of the plastic insert. Thus, the elastomeric material will form a stronger bond with the plastic insert than with prior art metallic inserts. Furthermore, there is less tendency for the plastic material to cut through the elastomeric material than there is for stamped sheet metal to cut through. In addition to these structural advantages, holes having generally parallel sides are less expensive to mold into the reinforcing member.

In the preferred embodiment of this seal, the reinforcing member is completely embedded in the elastomeric material. Thus, the reinforcing member 21 is entirely covered by the elastomeric material. The ends of each of the two separate elements which form the seal are squared-off, as is shown in FIG. 6. Each of the reinforcing members 21 has a notch 32 at the end of the member. This notch is filled with elastomeric material 20. By having both of the notches 32 filled with the elastomeric material, a tighter seal is formed when the two edges of the seal members are butted together, as shown in FIG. 6. By having the two notches filled with the elastomeric material 20, two relatively large bodies 34 of elastomeric material abut each other and tend to form a single unified seal of the elastomeric material. Through experimentation it has been found that this form of a seal, in certain applications, is more efficient than having squared-off reinforcing elements without the notch 32. Since the end of the seal is flush, it does not tend to collect foreign material which would tend to disrupt the sealing effect of the elastomeric material when forced together by the installation of the seal.

From the description of the seal given, it is apparent that the reinforcing member, through the action of the reinforcing rib 28, is able to provide greater support for the sealing lip 26 than in prior art seals. This additional support results in the distal portion 27 of the lip 25 of the seal being firmly pressed against the rotating shaft 12, thereby forming a tighter seal than has been previously possible. The use of a nylon or other plastic material for the reinforcing member has been found to be particularly advantageous, since the nylon yields a stronger bond to the elastomeric material than is the case with the metallic inserts used in prior art reinforcing members. This bond between the elastomeric material and the reinforcing member is enhanced by the use of parallel holes 30 through the body of the reinforcing member. The use of the parallel holes results in a stronger connection between the elastomeric material and the reinforcing member when the seal is subjected to rotative shear stresses. The seal between the two sealing members is enhanced, in the present embodiment, through the use of notches 32 which provide for two relatively large adjacent bodies of elastomeric material. When the two ends of the seal are forced together, by their installation in an engine block or other environment, the elastomeric material in the notches 32 forms a tight seal.

The specific example herein shown and described is intended for use around the crank-shaft of an engine. It would be obvious to one skilled in the art that the same principles which give a superior seal in this case could be used to seal a device wherein the shaft was stationary and there was a movable sleeve which rotated about the shaft. This would merely entail a reversal of the parts of the present seal. Various other changes in the structure would no doubt occur to those skilled in the art, and these changes are to be understood as forming a part of this invention insofar as they fall within the spirit and scope of the appended claims.

What is claimed is:

1. An oil seal comprising: an arcuate body of elastomeric material, an integral sealing lip of elastomeric material extending radially from said body, and a substantially rigid arcuate reinforcing member of a nonmetallic material embedded in said body, said reinforcing member having a pair of spaced apart side sections and a base section interconnecting said side sections, said base section having an arcuate rib extending into said lip, said rib being of similar shape to said lip having a first surface which is substantially parallel to one of said side sections and a second surface which is at an oblique angle to a surface of said base section and substantially parallel to a face of said lip.

2. An oil seal as set forth in claim 1 in which the surface of said base section adjacent to said rib is substantially even and said rib is substantially solid.

3. An oil seal as set forth in claim 1 wherein there are substantially parallel holes in said base section.

4. An oil seal as set forth in claim 1 wherein there is a notch in the end of said reinforcing member, said notch being completely filled by said elastomeric material.

5. An oil seal comprising: an arcuate body of elastomeric material, an integral sealing lip of elastomeric material extending radially from said body, and substantially triangular in axial section a substantially rigid arcuate reinforcing member embedded in said body, said reinforcing member having a pair of spaced apart side sections and a base section interconnecting said side sections, said base section having an integral solid arcuate rib extending into said lip and of a similar triangular shape in axial section said rib having a first surface which is substantially parallel to one of said side sections, said rib having a second surface which is at an oblique angle to a surface of said base section, a termination of said second surface being located at the junction of one of said side sections and said base section, and a substantially even surface of said base section adjacent said rib.

References Cited

UNITED STATES PATENTS

| 1,613,066 | 1/1927 | Turner | 277—152 X |
| 2,729,482 | 1/1956 | Kosatka | 277—178 |
| 3,003,799 | 10/1961 | Marchionda et al. | 277—182 |

SAMUEL ROTHBERG, *Primary Examiner.*